United States Patent [19]

High, Jr. et al.

[11] Patent Number: 5,925,095
[45] Date of Patent: Jul. 20, 1999

[54] METHOD AND A COMPUTER PROGRAM PRODUCT FOR CLIENT/SERVER COMPUTING WITH SUPPORT FOR BOTH RECOVERABLE AND NON-RECOVERABLE CLIENTS

[75] Inventors: Robert Howard High, Jr., Round Rock, Tex.; Simon Holdsworth, Andover, United Kingdom; Martin Mulholland, Eastleigh, United Kingdom; Kathryn Sarah Warr, Winchester, United Kingdom

[73] Assignee: International Business Machines Corporation, Armonk, N.Y.

[21] Appl. No.: 08/854,715

[22] Filed: May 12, 1997

[51] Int. Cl.⁶ .............................. H03K 19/00; G06F 9/06; G06F 13/10; G05B 19/048
[52] U.S. Cl. .............................. 709/2; 709/203; 709/205; 709/300; 709/305
[58] Field of Search .............................. 395/200.33, 671, 395/685, 680, 707, 200.35

[56] References Cited

U.S. PATENT DOCUMENTS 5,440,744  8/1995  Jacobson ................................. 395/650
5,586,312  12/1996  Johnson ................................. 395/610
5,630,133  5/1997  Hotea ..................................... 395/671

FOREIGN PATENT DOCUMENTS 0677943  10/1995  European Pat. Off. .

*Primary Examiner*—Ellis B. Ramirez
*Assistant Examiner*—Stephanie D. Hicks
*Attorney, Agent, or Firm*—David A. Mims, Jr.

[57] ABSTRACT

Client/server middleware processes a source code client application program so that when the application program signifies the beginning of a transaction using a transaction begin command, the transaction is automatically created locally for a recoverable client and remotely for a non-recoverable client. The source code client application program can thus be written without regard to whether the transaction will be created locally or remotely, the middleware takes care of this function.

6 Claims, 4 Drawing Sheets

Transaction

```
Current ⟶ begin              ] 401
        read ___
        write ___
        read ___              ] 402
        write ___

Current ⟶ commit             ] 403
        end
```

METHOD AND A COMPUTER PROGRAM PRODUCT FOR CLIENT/SERVER COMPUTING WITH SUPPORT FOR BOTH RECOVERABLE AND NON-RECOVERABLE CLIENTS

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series up objects, one of which is a coordinator object which coordinates the transaction with respect to the various servers.

Because there is always a chance of failure, the process must store the state data for the transaction in such a way that this state data is recoverable in the instance of a failure of the machine or process holding the state data. That is, in the event of system failure, this state data can be stored as a log file in external memory local to the machine or process holding the state data, just as the system is beginning to fail. After the problem giving rise to the failure has been identified and corrected, the system is revived and the state data is reloaded so that the transaction that was in progress can be completed.

When a client application begins the transaction, there are two possible architectural choices available for selecting the location of the transaction state data. The first is the so-called "recoverable client" where the state data is stored locally to the client process. In this case, the client must have enough function included within it so that it can act as a server, since it must be able to accept remote method invocations on objects created as part of the transaction state data. For example, each server involved in the transaction must register itself with the client.

The modern trend is to move away from adding function to clients and to have, instead, "pure" or "thin" clients which cannot act as servers. For example, this is the main thrust of the network computing paradigm which is steadily growing in popularity as clients are being given less and less function so that central changes can be made to server functionality without having to make the same changes to each client functionality. Also, the cost of client machines can be significantly reduced, as such machines do not require any storage at all (all storage is located at the remote servers). Thus, the second architectural choice for selecting the location of the transaction state data is the "non-recoverable client" where the transaction state data is stored off of (remote from) the client process (for example, on one of the servers).

Both of these architectural choices have their relative advantages and disadvantages. Therefore, it is highly advantageous to be able to support either architecture depending on the circumstances. However, when implementing a transaction the client application source code must be written in a different way depending on whether a recoverable client or a non-recoverable client is to be used. If the client is recoverable, the client application source code must include the code to create the transaction locally, and if the client is non-recoverable, the client application must include the code to create the transaction remotely.

Thus, a client application originally written for a recoverable client platform cannot easily be ported to a non-recoverable client platform. A source code client application can only be built and run in one architectural environment.

If the source code writer attempts to get around this problem, he/she faces a heavy burden because in order to write an architecture independent application, the client application would have to contain two versions of the application (one for each of the two architectures mentioned above), as well as code portions for distinguishing the architectures to decide which version to use in a given case. In providing this extra software code, the client programmer is distracted from his/her task of writing the substantive parts of the client application.

SUMMARY OF THE INVENTION

According to a first view, the present invention provides a method of writing a source code computer program for executing on a client in a client/server computing system, the computer program including transactions which include commands to access resources on servers, the method including steps of: signifying the beginning of a transaction using a begin command; signifying intermediate portions of a transaction using access commands; and signifying the end of a transaction using either a commit or a rollback command; characterized in that the signifying the beginning of a transaction step is performed independently of whether the client is recoverable.

According to a second view, the present invention provides a method of processing a source code computer program for running on a client in a client/server computing system, the source code computer program including a transaction begin command, commands to access resources on servers and a transaction end command, wherein said transaction begin command is written independently of whether said client is recoverable, the method including steps of, in response to said transaction begin command: creating the transaction locally on said client said client is recoverable; and creating the transaction remotely with respect to said client if said client is non-recoverable.

According to a third view, the invention also provides a source code computer program, stored on a computer-readable storage medium, for executing on a client in a client/server computing system, the computer program including transactions which include commands to access resources on servers, the source code computer program including respective code portions for performing the functions listed above with respect to the method steps of the first view of the invention.

According to a fourth view, the invention also provides a computer program, stored on a computer readable storage medium, for use in processing a source code computer program for running on a client in a client/server computing system, the source code computer program including a transaction begin command, commands to access resources on servers and a transaction end command, wherein said transaction begin command is written independently of whether said client is recoverable, the computer program including respective code portions for performing the functions listed above with respect to the method steps of the second view of the invention.

While the invention can be viewed as either a method of writing a source code program or a method of processing this source code program, the unifying feature linking these two views of the invention is that the source code need not have implementation details concerning where the transaction is created. In the first view, the indication of the beginning of the transaction is provided independent of the recoverability of the client. In the second view, details of the recoverability of the client (i.e., how and where the transaction state data is created) are obtained during the processing stage (and thus such details do not have to be included in the source code itself). Thus, these two views are unified by a common invention.

With the present invention, a client application can be written without regard to whether or not the client is recoverable. That is, the recoverable issue is transparent to the client application (source code) writer. This frees the application writer from having to concern himself/herself about client recoverability, and thus allows him/her to spend more time and effort writing the substantive parts of the source code application.

The invention also enables a written source code client application to be applicable to a wider range of uses without requiring any modification in the client application. That is, once the source code application is written, it can then be built (compiled and linked) and run on both a recoverable and a non-recoverable client platform without modification. In this way, client applications written originally for recoverable clients can easily be ported for use on non-recoverable clients, thus taking advantage of the advantages attainable with a "thin" client, the network computing goal.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

The Common Object Request Broker (CORBA) Object Transaction Service (OTS) supplies an interface object known as "Current" which has a "Begin" method used by client application programs (source code) to signal a beginning of a transaction to the underlying software layers. According to the preferred embodiment of the present invention, when the client application is being built or executed on a particular client architecture and contains the "Begin" method, the underlying software will proceed appropriately to create the transaction by setting up the transaction state objects in an appropriate manner depending on whether the client is recoverable or nonrecoverable.

Thus, the client application source code can be written without regard to whether the client platform that will build (compile and link) and/or run the application is recoverable or non-recoverable. This greatly simplifies the source code application writer's work. The source code can be written so as to simply call the "Begin" method on the "Current" object and the object-oriented middleware will take care of the transaction creation details (operating one way if the client is recoverable and another way if the client is non-recoverable).

Firstly, independent of any client architecture, the client source code is written by the programmer, as usual, but where the client application writer wishes to begin a transaction, the application writer need only provide an indication that the "Begin" method is invoked on the Current object (there is no need to specify any details as to whether a specific architecture will be used at build or run time to create the transaction locally or remotely). This will be explained in more detail below in conjunction with FIGS. 4 and 5.

Secondly, once the client application source code has been written, the next step is to build the executable application from the source code. This is a well-known two-stage process involving (see FIG. 6) compiling and linking stages, which are performed on a particular client architectural platform (recoverable or non-recoverable). When an instruction is received to build the source code, the person issuing such an instruction supplies the compiler/linker with the name of the source code file to be built along with the name of a DLL (Dynamic Link Library) file to be used during the linking stage. The compiler/linker then proceeds to build the executable application from the source code.

Thirdly, once the executable application has been built, the executable application is installed and run on a particular client architectural platform (i.e., a recoverable client or a non-recoverable client). This will be explained in more detail below in conjunction with FIGS. 7 and 8.

Figure 1:
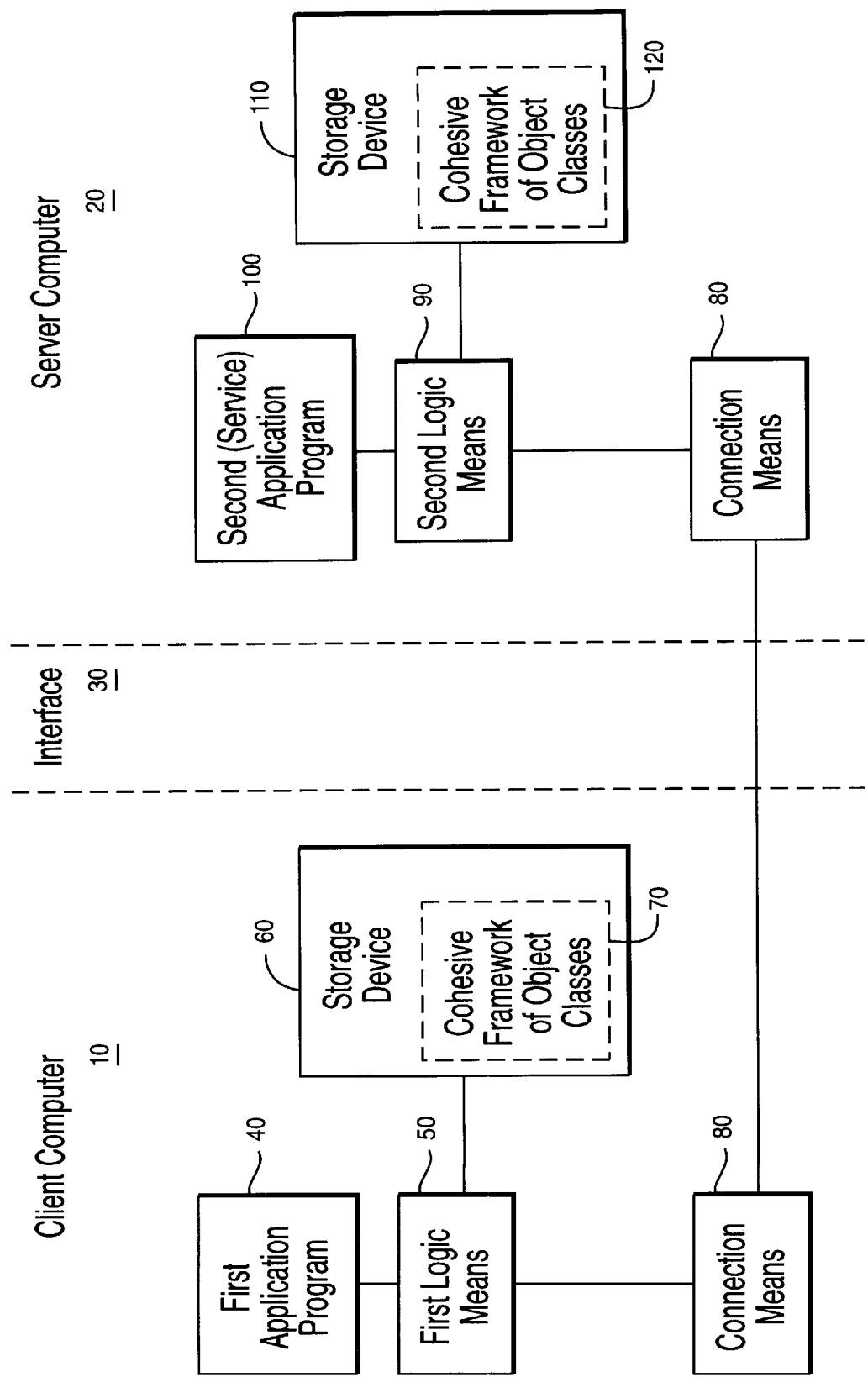
FIG. 1 is a block diagram of a well-known heterogeneous client/server architecture using object technology, in the context of which preferred embodiments of the present invention can be applied.
Figure 2:
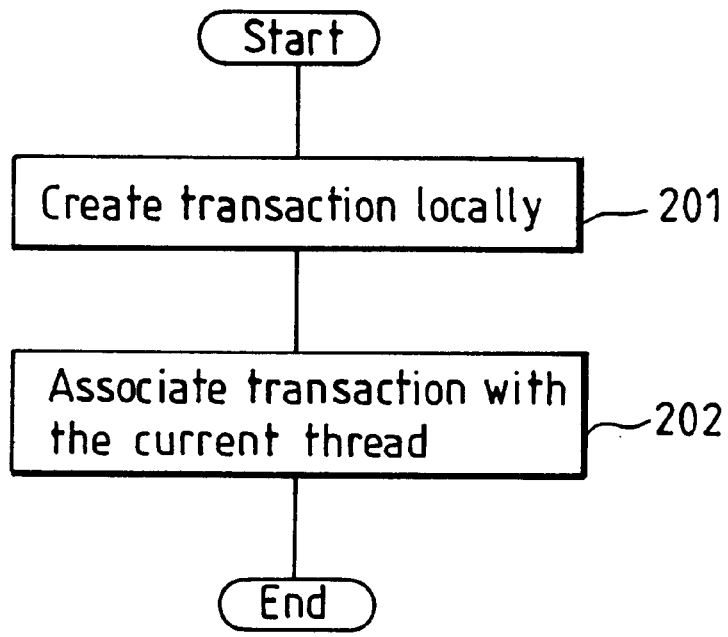
FIG. 2 is a flowchart showing the steps taken when a client application is being processed on a recoverable client and a transaction is begun, according to a preferred embodiment of the present invention.

If the executable client application is run on a recoverable client, when the part of the executable application which calls the DLL file name (e.g., transactions.dll) is reached (meaning that the client application source code has included an invocation of the "Begin" method on the "Current" object), the client operating system locates this DLL file by looking for a file named transactions.dll in each directory specified in the search path applicable to the environment in which the client application was invoked. For the recoverable client environment, the DLL file, transactions.dll, is stored in one of the path directories and includes the following functionality as shown in FIG. 2.

At step 201, the transaction is created locally, by setting up the transaction state data using the local transaction factory. At step 202, the created transaction is associated with the current thread on which the client application is currently running.

After the Begin method in this DLL is executed, the transaction is begun and the executable client application then proceeds to access remote resources (held on remote servers) in accordance with the substantive aspects of the transaction. When the transaction is finished, the client issues a transaction commit or transaction rollback command as appropriate to inform the remote resources that the transaction is finished.

Figure 3:
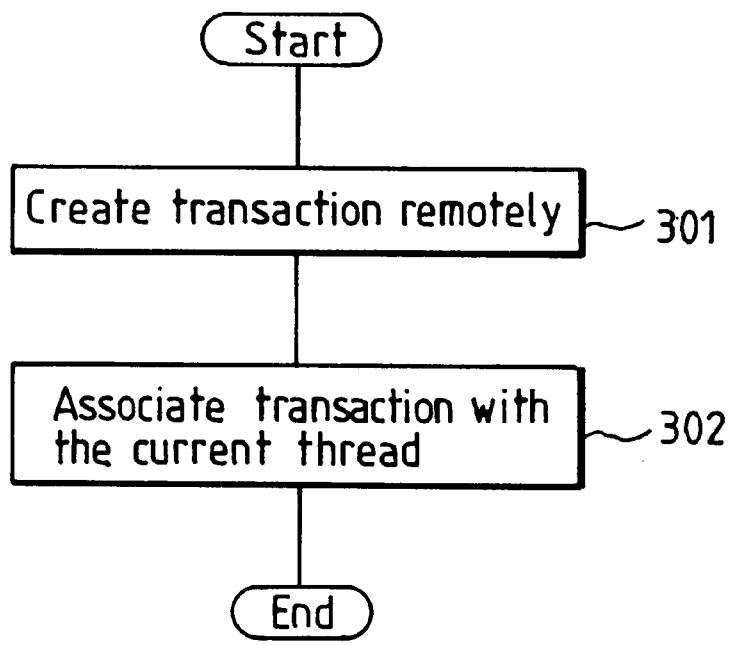
FIG. 3 is a flowchart showing the steps taken when a client application is being processed on a nonrecoverable client and a transaction is begun, according to a preferred embodiment of the present invention.

If the executable client application is run on a non-recoverable client, when the part of the executable application which calls the DLL file name (transactions.dll) is reached (meaning that the client application source code has included an invocation of the "Begin" method on the "Current" object), the client operating system locates this DLL file by looking for a file named transactions.dll in each directory specified in the search path applicable to the environment in which the client application was invoked. For the non-recoverable client environment, the DLL file, transactions.dll, is stored in one of the path directories and includes the following functionality as shown in FIG. 3.

At step 301, the transaction is created remotely, by locating a remote transaction factory using an appropriate naming service, and setting up the transaction state data using the remote transaction factory. At step 302, the created transaction is associated with the current thread on which the client application is currently running.

After the Begin method in this DLL is executed, the transaction is begun and the executable client application then proceeds to access remote resources (held on remote servers) in accordance with the substantive aspects of the transaction. When the transaction is finished, the client issues a transaction commit or transaction rollback command as appropriate to inform the remote resources that the transaction is finished.

Figures 4, 5:
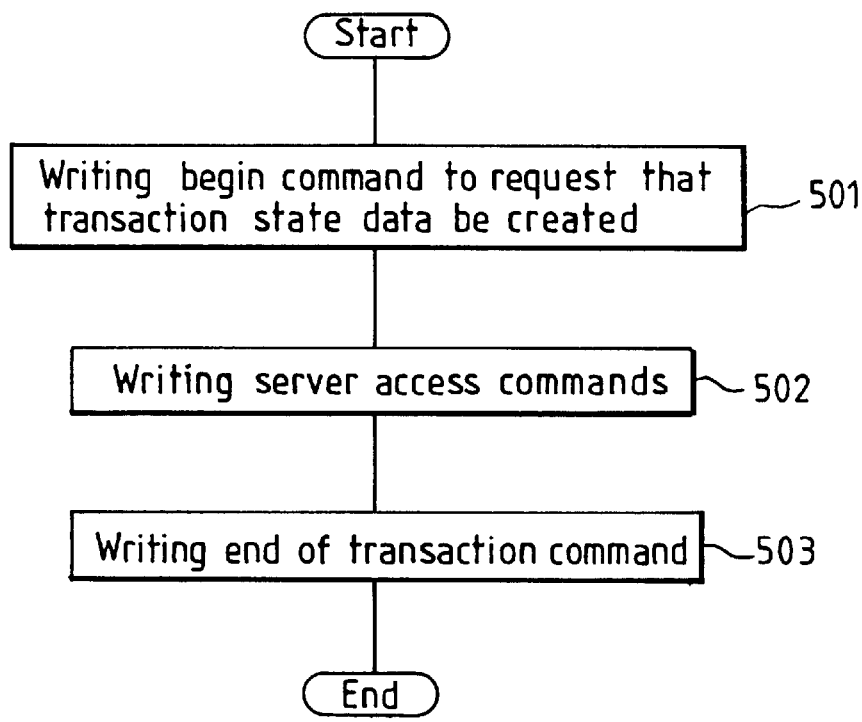
FIG. 4 shows an example of a source code client application transaction which can be written according to a preferred embodiment of the present invention.
FIG. 5 is a flowchart showing the steps involved in writing a source code client application transaction according to a preferred embodiment of the present invention.

An example of a simplified source code client application transaction which can be written according to the present invention is shown in FIG. 4. The transaction begins with a generic "Begin" call to the object "Current" (401). The intermediary portions of the transaction are the actual access calls to servers (402). The transaction ends by informing the servers to commit the changes they have made to their resources via the access commands (step 403).

In this way, as shown in FIG. 5, the client application source code can be written without regard to whether it will be eventually run on a recoverable or a non-recoverable client. At step 501, the client application source code writer writes a "Begin" command signifying that a transaction is to begin and that transaction state data should be created. By simply using the "Begin" command and no other instructions to create the transaction, the application writer signifies the beginning of the transaction independently of the recoverability of the client that will eventually run the application. It is only necessary for the application writer to write a command to invoke the "Begin" method on the "Current" object and it is not necessary for the application writer to include any detail as to how or where the transaction will be created. This will be taken care of at run time, as explained above, by the underlying client software.

The application writer then writes the server access commands (read and write commands 402 of FIG. 4). Finally, the end of transaction command (403) is written (step 503).

Figure 6:
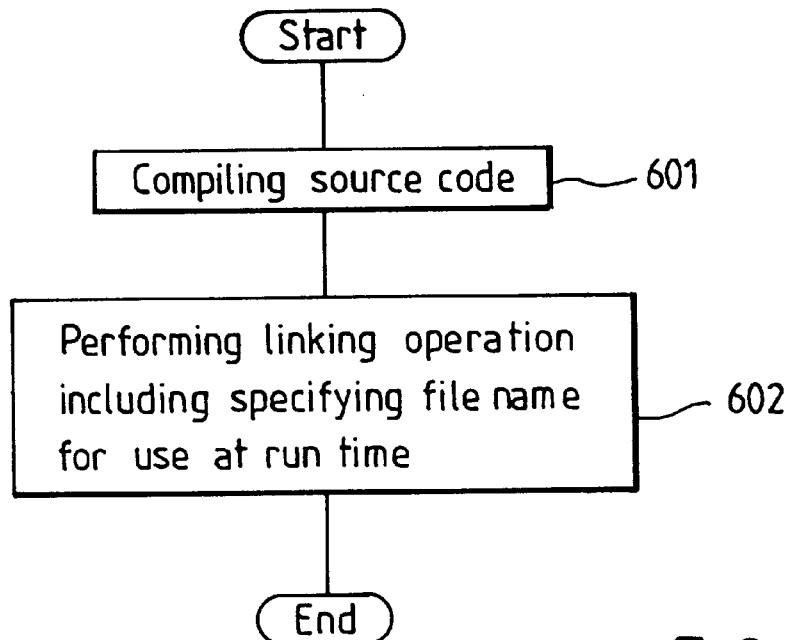
FIG. 6 is a flowchart showing the steps involved in building an executable client application from a source code client application according to a preferred embodiment of the present invention.

The steps involved in building the executable client application from the source code version will now be listed with reference to FIG. 6. First, the source code is compiled (step 601). Second, a linking stage is performed on the compiled results, as explained above. This linking operation includes the specifying of the file name as explained above. The result is an executable client application which can then be run on a client platform. As explained above, this executable client application can be run on either a recoverable or a non-recoverable client without any change to the code, as illustrated in FIG. 7.

Figure 7:
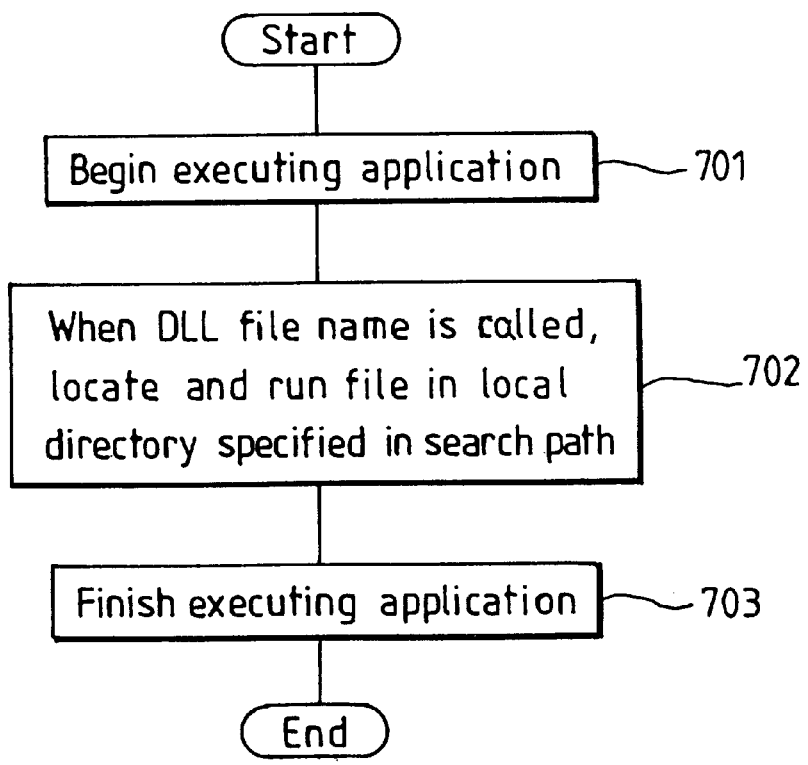
FIG. 7 is a flowchart showing the steps involved in running the executable client application according to a preferred embodiment of the present invention.

FIG. 7 is a flowchart showing the steps involved in executing the built application on a particular client platform. First, the execution of the built program is begun (step 701) and when the DLL file name is called, locate and run the file in the directory specified in the search path (as explained above) (step 702). In a first embodiment, if the client executing the application is running on a recoverable platform, the client will have a DLL in its directory that will create the transaction locally. In this same first embodiment, if the client executing the application is running on a non-recoverable platform, the client will have a DLL in its directory that will create the transaction remotely. The client then finishes executing any remaining portions of the application (step 703).

By using the same file name for the respective DLLs in both platforms, the build process in FIG. 6 can be performed independent of the client platform that will run the built program. That is, the same file name can be supplied during linking whether or not the client platform that will run the program is recoverable or not. The correct DLL file will be accessed during execution (step 702) because the client platform used to run the executable application will have only one file stored with that common file name.

A second embodiment of the present invention (which is also reflected by the FIG. 7 flowchart) differs from the first as follows. In the first embodiment, one DLL file (providing the functions shown in FIG. 2) is stored in a directory of a recoverable client that runs the executable program and a different DLL file (providing the functions shown in FIG. 3) is stored in a directory of a non-recoverable client that runs the executable program. In the second embodiment, the same DLL file is stored on both a recoverable and a non-recoverable client that runs the executable program, and includes the function of both FIGS. 2 and 3. The DLL file also includes function to make a determination as to whether the client that is running the application is recoverable or not (e.g, using an environment variable) and then executes the function of either FIG. 2 or FIG. 3, accordingly.

In a third embodiment, the functionality of selecting either the FIG. 2 steps of the FIG. 3 steps is implemented during the linking stage (602 of FIG. 6). During linking, an appropriate file name is specified depending on whether a recoverable or non-recoverable client will run the application. Thus, when the application is run, the appropriate DLL file will be accessed at step 702 of FIG. 7. In this third embodiment, the two DLL files must have unique file names so that they can be correctly identified during linking and execution.

We claim:

1. A method of processing a source code computer program for running on a client in a client/server computing system, the source code computer program Including a transaction begin command, commands to access resources on servers and a transaction end command, wherein said transaction begin command is written independently of whether said client is recoverable, the method including steps of, in response to said transaction begin command:

creating the transaction locally on said client if said client is recoverable;

creating the transaction remotely with respect to said client if said client is non-recoverable, and selecting one of the two creating steps based on a respective file specified during linking.

2. The method of claim 1 wherein one of the two creating steps is selected based on a file common to both creating steps specified during linking.

3. The method of claim 1 wherein each respective file has the same file name.

4. A computer program product stored on a computer readable storage medium, for processing a source code computer program running on a client in a client/server computing system, the source code computer program including a transaction begin command, commands to access resources on servers and a transaction end command, wherein said transaction begin command is written independently of whether said client is recoverable, the computer program product including software code portions for performing steps of, in response to said begin command:

creating the transaction locally on said client if said client is recoverable;

creating the transaction remotely with respect to said client if said client is non-recoverable, and selecting one of the two creating steps based on a respective file specified during linking.

5. The computer program product of claim 4 wherein one of the two creating steps is selected based on a file common to both creating steps specified during linking.

6. The computer program product of claim 4 wherein each respective file has the same file name.

* * * * *